United States Patent [19]
Traeger

[11] 3,813,557

[45] May 28, 1974

[54] GAS TURBINE VEHICLE DRIVE

[75] Inventor: Alfred H. Traeger, Erindale, Australia

[73] Assignees: Traeger Patents PTY. Limited, Marryatville; Traeger Charitable Trust Incorportated, Adelaide, both of, Australia

[22] Filed: Jan. 18, 1973

[21] Appl. No.: 324,584

[30] Foreign Application Priority Data
Jan. 20, 1972   Australia............................ 7717/72

[52] U.S. Cl....................... 290/2, 290/17, 290/14, 180/60
[51] Int. Cl............................................. B60l 11/02
[58] Field of Search.......... 290/1, 9, 16, 17, 51, 14, 290/40; 318/151; 180/60

[56] References Cited
UNITED STATES PATENTS

| | | | |
|---|---|---|---|
| 2,437,011 | 3/1948 | Weier | 290/14 |
| 2,558,866 | 7/1951 | May et al. | 290/17 |
| 2,581,596 | 1/1952 | Nims | 318/151 X |
| 2,658,154 | 11/1953 | Brancke et al. | 290/16 |
| 2,703,845 | 3/1955 | Stamm | 290/17 |
| 3,263,142 | 7/1966 | Adoutte et al. | 290/14 |
| 3,477,537 | 11/1969 | Plishner | 290/16 |
| 3,525,874 | 8/1970 | Toy | 290/17 |
| 3,565,202 | 2/1971 | Evans | 290/17 |

Primary Examiner—G. R. Simmons
Attorney, Agent, or Firm—James B. Kinzer; Thomas E. Dorn

[57] ABSTRACT

A vehicle in which a coupled gas turbine and compressor and electrical generator are rotationally coupled to be pulsed under speed governor control to run at a relatively constant speed, and drive from the generator is controlled to supply the required power to motors coupled to the vehicle wheels, the compressor preferably being a piston compressor with air inlet control, the turbine also having controlled gas intake by regulating gas input and also gas generator in the combustion chamber, all under control of the speed governor.

3 Claims, 1 Drawing Figure

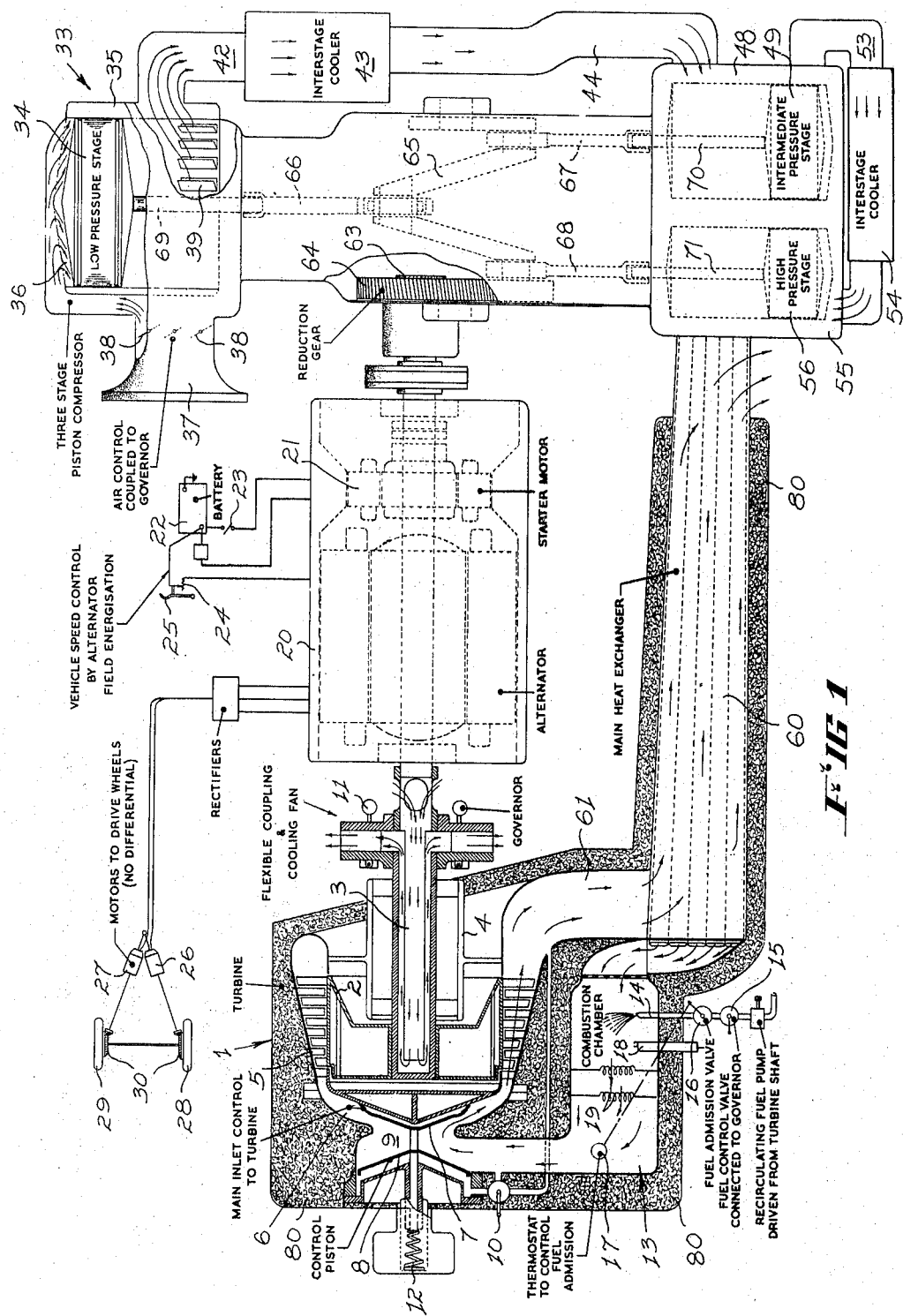

GAS TURBINE VEHICLE DRIVE

BACKGROUND OF INVENTION

This invention relates to improvements in and to turbines and in particular it relates to turbines which can be used for driving motor vehicles or the like particularly where low pollution is required and where ready handling and simplicity of construction as well as high efficiency are to be attained.

Turbine drivers of many types are of course well known, and these usually comprise a turbine to which air is fed under pressure, the turbine being driven by heated air generated in a combustion chamber and the turbine in turn being used to produce thrust or to drive propellers or the like.

It has been proposed heretofore to utilize turbines for driving motor vehicles but certain difficulties exist in this owing to the need for constant acceleration and deceleration, and as will be realised turbines are not suitable for operating under such conditions if a relatively high efficiency is to be obtained and if the speed changes of a vehicle or the like must be frequently effected.

Also owing to the high operating speed of turbines it is not possible to readily achieve fast acceleration or deceleration, and one of the objects of the present invention therefore is to provide an improved form of turbine which will have a high efficiency yet which will not be subject to the problems of acceleration changes or inefficient operation due to such changes.

SUMMARY OF INVENTION

With this object in view the turbine is designed to run at a constant speed on an impulse system and is governed and controlled in such a way that this constant speed is maintained by controlled impulse of combustion, and if for instance such a turbine is to drive a motor vehicle, the shaft of the turbine can be coupled to an alternator the output of which can be rectified and passed to a drive motor or motors in the wheels of the vehicles, or connected thereto, but the actual drive is controlled by regulating the supply of the field of the alternator so that when the vehicle is stationary no field is present in the alternator and therefore the turbine runs under light load without effecting any drive of the vehicle, but immediately the field is energised, power will be transmitted to the wheels. To maintain the speed of the turbine a govenor mechanism will immediately supply the necessary controlled quantities of fuel and air to ensure that while the turbine runs at a constant speed, the speed being maintained by pulsed fuel and combustion supply the vehicle speed can be varied by simply controlling the field of the alternator.

The actual construction of the turbine is relatively simple and is of small dimension because of the constant speed characteristic as maintained by correctly proportioned and tuned impulses, but according to its preferred form such a unit comprises a turbine into which the combustion gases are fed from a combustion chamber, this turbine in turn being coupled by means of a shaft to a multi-stage piston-type compressor, as well as an alternator and a starter motor, the starter motor being driven by means of a battery or the like to start the turbine and run it up to speed.

As the turbine is driven by the starter motor, air is compressed in the low pressure compressor section and is passed to a high pressure section, but through a heat exchanger so that there is a temperature drop in air as it passes from the low pressure section to the high pressure section to ensure that the high pressure section operates at maximum attainable efficiency, the air from the high pressure section of the compressor being then passed through a regenerator, which is again a heat exchanger, to the combustion chamber where fuel is fed to it by a fuel pump controlled by a governor.

Combustion takes place in this combustion chamber and the outlet feeds to the turbine through a flow control valve, the exhaust from the turbine passing to atmosphere through the regenerator where the heat from the spent gases leaving the turbine is transferred to the incoming air which is pumped to the combustion chamber to maintain an efficient operating cycle.

Thus for instance atmospheric air entering the low pressure section of the compressor, is raised in temperature as the pressure is raised but the heat exchanger dissipates this heat to the atmosphere through a radiator or the like and the compressed air passes to the high pressure compressor in a cool condition, where however it is compressed to the required value and there passes through the regenerator to the combustion chamber, the arrangement preferably being such that the temperature of the air leaving the high pressure section of the compressor is perhaps 60° C, but after passing through the regenerator which is heated by the outflow of gases from the turbine, it reaches 300° C at the combustion chamber where its temperature can be raised to perhaps 700° C, but leaves the turbine at 300° C, most of which heat is then given up to the air being pumped into the combustion chamber. Thus only low temperature gases are discharged from the unit.

Because the system runs at a constant speed by impulse feed all conditions can be arranged for maximum efficiency, and by utilizing a governor which adjusts the flow of fuel to the combustion chamber and the flow of gases from the combustion chamber to the turbine, it will be realised that on light loads fuel consumption is negligible, but immediately the alternator is loaded, the speed of the turbine shaft will tend to drop with the the result that the fuel supply is increased and turbine speed will be maintained at proper operating conditions.

The shaft between he turbine and compressors and alternator is preferably hollow, so that it can be liquid or fluid cooled.

As stated earlier the starter motor can be used to run the turbine up to speed, but then the turbine will maintain this speed under governor control under all conditions, the only variation being in accordance with a load applied to the alternator, but this variation in load is automatically taken care of by variation in the pulsed fuel supply, and the correspondingly varied air supply due to controlled intake throttling.

As stated, the drive motors can be positioned inboard with axles going to the wheels, or they can be positioned in the wheels of a vehicle, these motors being D.C. Motors fed through rectifier means from the alternator which has a controlled field so that by reducing the field the drive will be reduced, thereby giving a highly effective speed control from zero to maximum by simply manipulating an accelerator.

Power requirements will automatically operate on the turbine governor to control the power output of this in relation to the power required at the wheels.

The heat exchangers must of course be constructed to have a high efficiency and according to the preferred form these comprise plates pressed to form longitudinal grooves and these plates are joined in pairs.

A series of pairs of plates so formed are placed with spaces between them and their ends joined to headers so that fluids fed to one header flow down the space defined by the pair of plates to the other header.

The space between the headers surrounding the pairs of plates is enclosed and provides the flow path for the other fluid so that a highly effective heat exchange takes place.

The construction can be considerably varied but the form referred to ensures high efficiency transfer.

As stated earlier the device can be varied in its application but by using an alternator and maintaining constant turbine speed, a high efficiency, with minimum pollution, results, and when applied to vehicles gives the flexibility required for normal vehicle operation.

BRIEF DESCRIPTION OF DRAWING

The sole FIGURE shows somewhat schematically and in part section a power plant designed for driving a motor vehicle, and demonstrates the principle of using a multistage piston compressor of high efficiency, coupled to a turbine the shaft of which drives an alternator which in turn drives the wheels through motors, current flow to the motors being governed by regulating field energisation.

DESCRIPTION OF PREFERRED EMBODIMENT

A turbine 1 has a rotor 2 carried on a shaft 3 supported in bearings 4, the stator 5, as well as the rotor having co-acting blades in a normal manner.

The intake duct 6 of the turbine has a control valve 7 in it which is acutated by a piston 8 in a chamber 9 under control of a valve 10 coupled to a governor 11 on the shaft 3. The coupling is not shown. The piston 8 is opened by a spring 12 when pressure on each side of the piston 8 is equal, but is closed against spring action when the chamber 9 is opened to atmosphere.

The combustion chamber is designated 13 and has in it a fuel supply nozzle 14 controlled by a valve 15 also actuated from the governor 11, but a further valve 16 in series with it controls fuel supply under influence of a thermostat 17 which prevents heating above a calculated value.

Ignition means are designated 18, while 19 represents reserve heat coils. The shaft 3 has on it the rotor of the alternator 20 and also carries the armature of the starter motor 21, the motor 21 being energised from a battery 22 through a switch 23.

The field coils of the alternator 20 are also energised from the battery 22 by the resistance 24 controlled by the accelerator 25, while the output from the alternator drives the motors 26 and 27 which are coupled to the road wheels 28 and 29 through suitable gearing 30.

The compressor 33, which must be of high efficiency comprises a first stage low pressure pump comprising a pistion 34 in a cylinder 35, air being drawn into the cylinder 35 on the retreating side of the piston 34 through valves 36 from the inlet which has air control vanes 38, and the compressed air leaves through the ports and valves 39.

Intake air is controlled by the valves 38 which are again connected to the governor 11.

From the cylinder 35 the air passes through the pipe 42, through the heat exchanger 43, and through the pipe 44 through inlet valves to the intermediate pressure cylinder 48 in which the piston 49 operates, the pressure air leaving through outlet valves into pipe 53 and the heat exchanger 54 to the high pressure cylinder 55 in which the piston 56 operates.

The regenertor 60 forms a heat exchanger between the compressed air flowing through from the cylinder 55 to the combustion chamber 13 and the exhaust gases leaving the turbine 1 through the exhaust pipe 61 so that the incoming air is heated to the required temperature by the exhaust gases.

The compressor 33 is driven from the shaft 3 by gears 63 and 64 which operate a crank shaft 65 which is coupled by connecting rods 66, 67 and 68 to the piston rods 69 and 70 and 71 of te pistons 34, 49 and 56 respectively.

Heat radiation is prevented by lagging 80 to ensure that maximum efficiency is achieved.

It will be obvious that the illustration is diagrammatic only so as to show the principle of operation, and the construction of the heat exchanges and regenerator can vary.

The function of the invention is as follows:

Assume the conditions as shown in the drawing, that is just after the starter switch 23 has been closed, the main turbine valve 7 is open, also the fuel valves 15 and 16. The ignition coil 18 is hot. The turbine 1 will gain speed, as will the compressor 33 and a fuel proportional to the speed of the turbine. The proportion of air to fuel is so adjusted as to give the most effective combustion mixture within a few seconds. Under these conditions the combustion chamber especially the reserve heat coils 19 will quickly heat up to the ignition temperature. The starter switch 23 can then be opened and the speed of the turbine will continue to increase until its correct speed is attained when the govenr 11 will operate and all valves will be shut off allowing the turbine to run free until the speed drops slightly when the governor will again open up all the valves.

The supply of fuel and air will stop while the turbine is running free but the reserve heat coil 19 will maintain its ignition temperature until the valves open again for another short burst of activity.

When operating at no load the bursts of activity will be very short, whereas during heavy load the valves will remain open for most of the time.

If the correct mixture of air and fuel is maintained the temperature in the combustion chamber would soon rise above the 1,000° C abslimit. When this occurs the thermostat 17 operates and close the fuel valve 16 thus diluting the mixture with air and reducigng the temperature.

The temperature in the combustion chamber being continuously in the vicinity of 700° C all fuel will be burnt to $CO_2$ and $H_2O$. At 700° C practically no dissociation into CO takes place.

The main turbine valve 7 is preferably operated by the two-way snap valve 10 connected to the governor 11. During the period when the valves are closed the snap valve is in such a position that the annular space 9 is connected to the atmosphere, whereas the connection to the high pressure source is closed. This places a high pressure on the inside of the valve piston diaphragm 8 against the spring 12 and effectively closes the valve and it remains closed because the area of the piston diaphragm is greater than that of the valve. When the control valve position suddenly changes, it closes the outlet to the atmosphere from the annular space and connects it to the high pressure source thus equalizing the pressure on each side of the piston diaphragm and allowing the spring 12 to open the valve. The spring will keep the valve open until the control valve springs back to its original position under governor action.

I claim:

1. A vehicle drive comprising,
   a. a gas turbine and a compressor and an electric generator rotationally coupled together as an assembly, said compressor being a piston compressor having air flow control means at its intake,
   b. a speed governor arranged to sense the rotational speed of the said assembly,
   c. a combustion chamber connected to receive the air from the said compressor and connected also to fuel supply control means and to the intake of the said turbine,
   d. the combustion chamber including a thermostat coupled to a fuel control valve in series with the said fuel control means whereby to limit temperatures within the combustion chamber by limiting fuel flow at excessive temperatures,
   e. a valve at the intake to the said turbine, said valve being coupled to the said fuel supply means an to air flow control means on the said compressor whereby said valve and said fuel control means and said flow control means act together under control of the said governor to which each is coupled to pulse the said turbine to maintain the turbine at a relatively constant speed irrespective of loads within the limits of the turbine design,
   f. heat exchange means between the turbine gas outlet and the air flowing to the combustion chamber from the said compressor,
   g. electrical coupling between said generator and motors connected to drive vehicle wheels and,
   h. means to control drive applied to the said wheels by regulation of the output of the said generator as it is driven at relatively constant speed by the said turbine.

2. A vehicle drive according to claim 1 wherein the said compressor is a multistage compressor with heat exchanges between stages to reduce air temperature after compression for higher volumetric efficiency.

3. A vehicle drive according to claim 1 wherein the electric generator is an alternator and the output is controlled by regulating field coil energization.

* * * * *